United States Patent
Creusot

(10) Patent No.: US 10,282,999 B2
(45) Date of Patent: May 7, 2019

(54) ROAD CONSTRUCTION DETECTION SYSTEMS AND METHODS

(71) Applicant: GM GLOBAL TECHNOLOGY OPERATIONS LLC, Detroit, MI (US)

(72) Inventor: Clement Creusot, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/461,762

(22) Filed: Mar. 17, 2017

(65) Prior Publication Data

US 2017/0242436 A1    Aug. 24, 2017

(51) Int. Cl.

| | |
|---|---|
| G05D 1/00 | (2006.01) |
| G05D 1/02 | (2006.01) |
| G08G 1/00 | (2006.01) |
| G08G 1/005 | (2006.01) |
| G08G 1/01 | (2006.01) |
| G08G 1/0962 | (2006.01) |
| G08G 1/0968 | (2006.01) |
| G06K 9/00 | (2006.01) |
| G06K 9/46 | (2006.01) |
| G06K 9/62 | (2006.01) |

(52) U.S. Cl.
CPC ......... *G08G 1/202* (2013.01); *G06K 9/00791* (2013.01); *G06K 9/00798* (2013.01); *G08G 1/005* (2013.01); *G08G 1/0112* (2013.01); *G08G 1/0133* (2013.01); *G08G 1/0141* (2013.01); *G08G 1/09623* (2013.01); *G08G 1/09626* (2013.01); *G08G 1/096816* (2013.01); *G08G 1/096844* (2013.01); *G06K 9/4628* (2013.01); *G06K 9/6274* (2013.01)

(58) Field of Classification Search
USPC .......................... 701/27, 23, 28, 41; 901/46
See application file for complete search history.

(56) References Cited

U.S. PATENT DOCUMENTS

| | | | |
|---|---|---|---|
| 2009/0202107 A1* | 8/2009 | Wilson | G06K 9/00818 382/103 |
| 2010/0207787 A1* | 8/2010 | Catten | G06F 17/30241 340/905 |
| 2014/0067187 A1* | 3/2014 | Ferguson | B60W 30/00 701/28 |
| 2016/0046290 A1* | 2/2016 | Aharony | G06K 9/00798 701/41 |
| 2016/0070264 A1* | 3/2016 | Hu | G08G 5/0069 701/2 |
| 2016/0139594 A1* | 5/2016 | Okumura | B60W 30/00 701/2 |
| 2017/0076607 A1* | 3/2017 | Linder | G08G 1/167 |
| 2017/0270406 A1* | 9/2017 | Visser | G06N 3/04 |
| 2017/0307735 A1* | 10/2017 | Rohani | G01S 7/417 |

* cited by examiner

*Primary Examiner* — Marthe Y Marc-Coleman
(74) *Attorney, Agent, or Firm* — Lorenz & Kopf, LLP

(57) ABSTRACT

Systems and method are provided for controlling a vehicle. In one embodiment, a method of detecting road construction includes receiving sensor data relating to an environment associated with a vehicle, determining that construction-related objects are present within the environment based on the sensor data, and determining whether a travel-impacting construction zone is present within the environment based on the presence of the construction-related objects in the environment.

20 Claims, 8 Drawing Sheets

ROAD CONSTRUCTION DETECTION SYSTEMS AND METHODS

TECHNICAL FIELD

The present disclosure generally relates to autonomous vehicles, and more particularly relates to systems and methods for detecting and accommodating road construction along a route in an autonomous vehicle.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in navigation systems, such systems might still be improved in a number of respects. For example, autonomous vehicles often encounter previously unknown road construction zones along a route to a planned destination. This can be inconvenient for the driver as well as the navigation system, which must then determine an alternate route to the destination. Furthermore, current systems are generally unable to notify other vehicles and users of the construction zone that has been encountered.

Accordingly, it is desirable to provide systems and methods that are capable of detecting and accommodating the presence of road construction along a route. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a first vehicle. In one embodiment, a method of detecting road construction includes receiving sensor data relating to an environment associated with a vehicle, determining that construction-related objects are present within the environment based on the sensor data, and determining whether a travel-impacting construction zone is present within the environment based on the presence of the construction-related objects in the environment.

In one embodiment, a system for controlling a vehicle includes a construction-related object module, including a processor, configured to receive sensor data relating to an environment associated with the vehicle and determine that construction-related objects are present within the environment based on the sensor data. The system further includes a construction zone determination module configured to determine whether a travel-impacting construction zone is present within the environment based on the presence of the construction-related objects in the environment.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
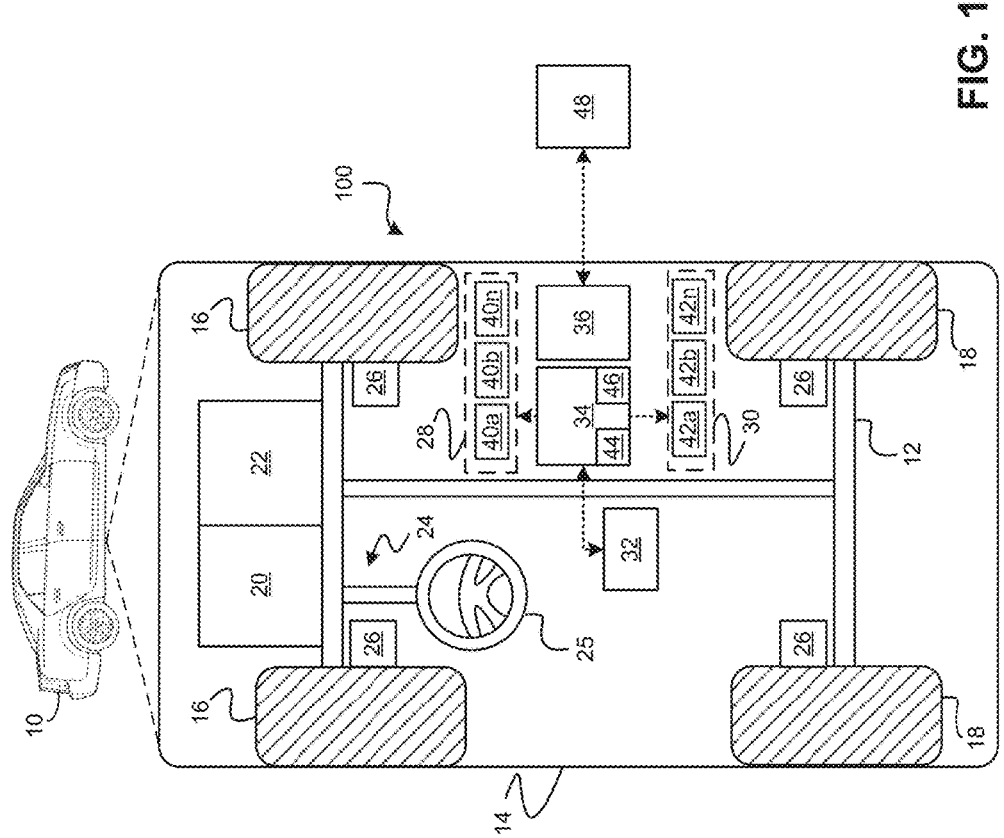
FIG. 1 is a functional block diagram illustrating an autonomous vehicle having a road construction sensing system, in accordance with various embodiments.

With reference to FIG. 1, a road construction sensing system shown generally as 100 is associated with a vehicle 10 in accordance with various embodiments. In general, road construction sensing system (or simply "system") 100 senses the presence of road construction along a route, provides an alternate route to the user, and updates a route database to reflect that one or more road segments along the route are unavailable.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the road construction detection system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, construction detection systems in accordance with the present embodiment may be used in conjunction with any autonomous vehicle that utilizes a navigation system to provide route guidance.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured to detect road construction by receiving sensor data relating to an environment associated with a vehicle, determine that construction-related objects are present within the environment based on the sensor data, and determine whether a travel-impacting construction zone is present within the environment based on the presence of the construction-related objects in the environment.

Figure 2:
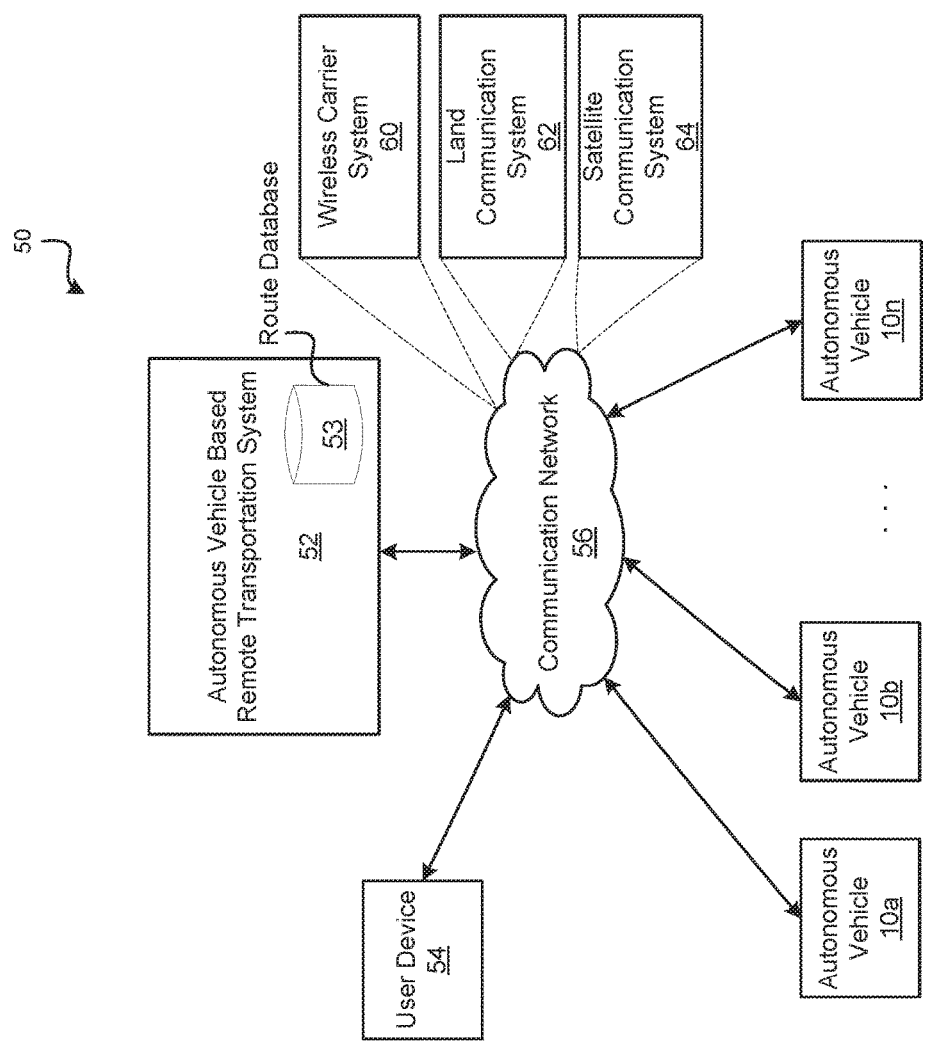
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player;

a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information. In one embodiment, as described in further detail below, remote transportation system 52 includes a route database 53 that stores information relating to navigational system routes, including whether and to what extent particular route segments are impacted by construction zones that have been detected by one or more of autonomous vehicles 10a-10n.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
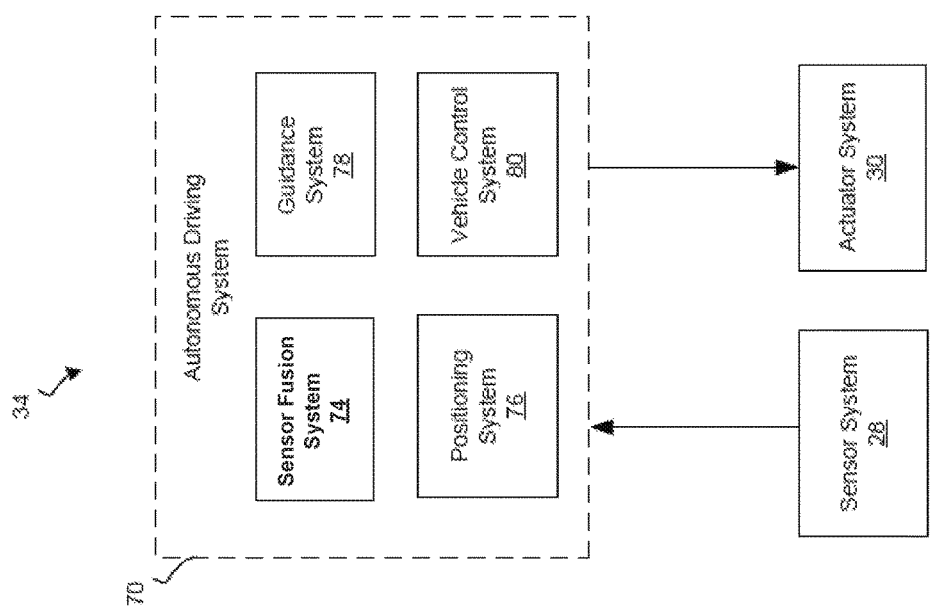
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
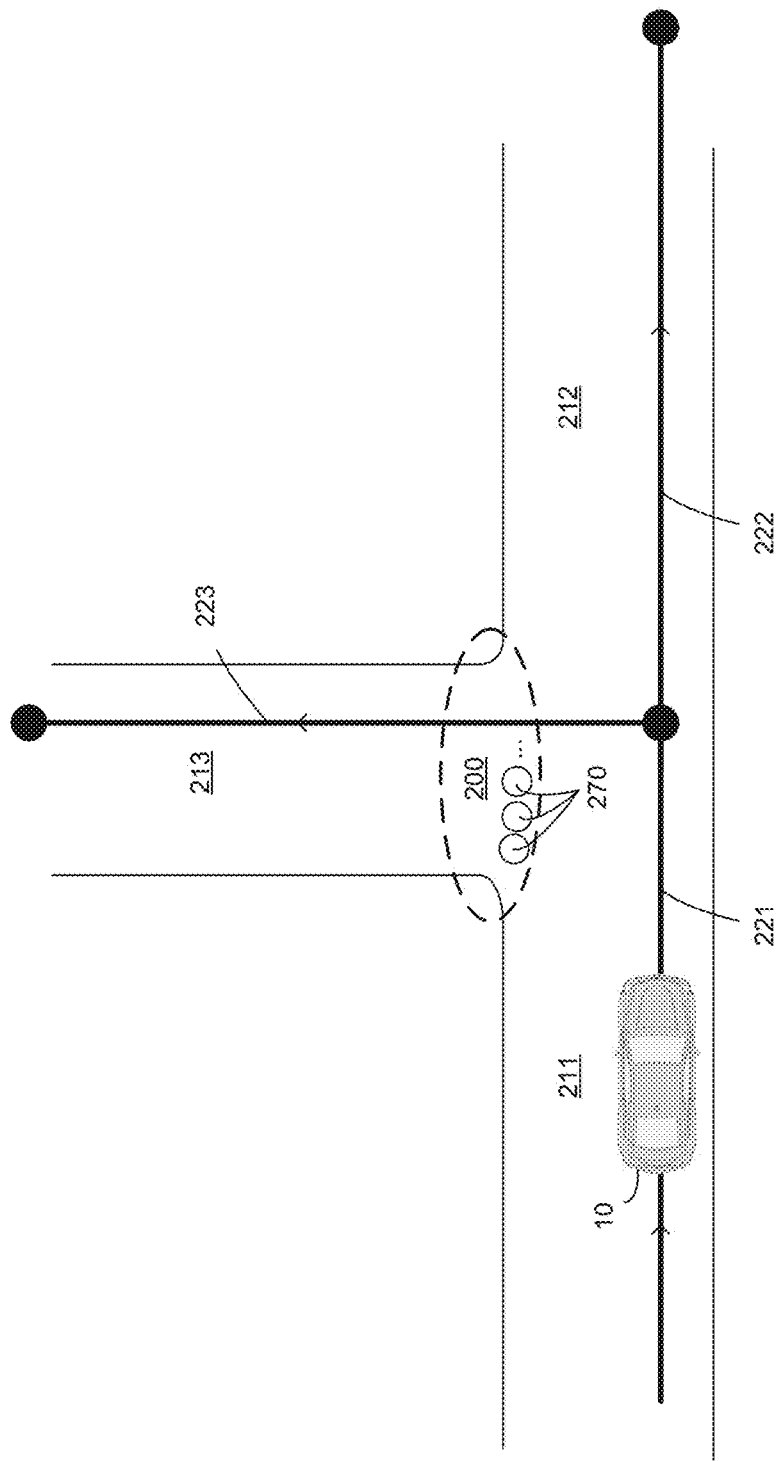
FIG. 4 is a top-down, conceptual view of a roadway and construction zone in accordance with various embodiments.
Figure 5:
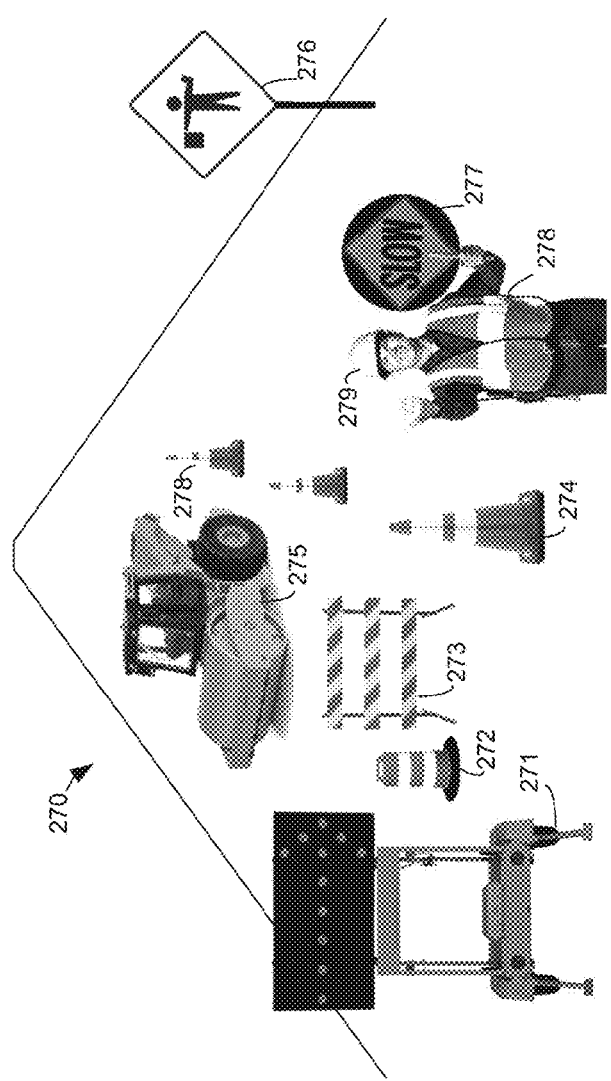
FIG. 5 presents example construction-related objects and indicia related to a travel-impacting construction zone in accordance with various embodiments.

As mentioned briefly above, the road construction detection system 100 of FIG. 1 senses the presence of road construction along a route, provides an alternate route to the user, and updates a route database to reflect that one or more road segments along the route are unavailable. In that regard, FIG. 4 is a top-down, conceptual view of a roadway and construction zone useful in describing various embodiments that might be employed in conjunction with the ADS 70 of FIG. 3. FIG. 5 illustrates example construction-related objects and indicia related to a travel-impacting construction zone in accordance with various embodiments, and FIG. 6 is a dataflow diagram that illustrates various embodiments of the road construction detection system 100 which may be embedded within the controller 34.

Figure 6:
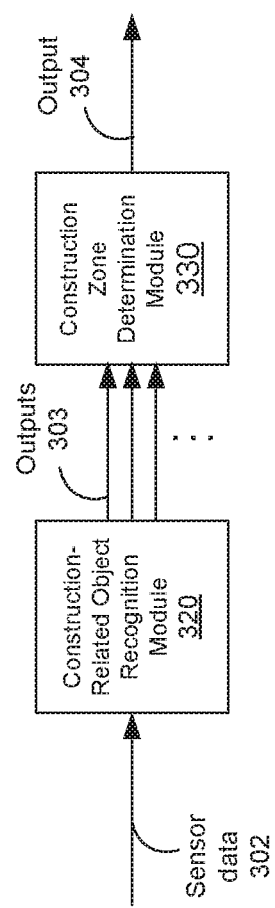
FIG. 6 is a dataflow diagram illustrating a construction detection system of the autonomous vehicle, in accordance with various embodiments.

Referring to FIG. 6, an exemplary road construction system generally includes a construction-related object recognition module 320 that receives sensor data 302 relating to the vehicle's environment (e.g., camera images, lidar data, or any other sensor data received from sensors 28) and has, as its output, an indication as to the presence of construction-related objects in the environment (illustrated as a set of outputs 303). Construction zone determination module 330 then takes these outputs 303 (e.g., information regarding the number and types of construction related objects observed) and produces an output 304 indicative of whether travel-impacting construction zone is present. In this regard, it will be understood that various embodiments of the system 100 according to the present disclosure can include any number of sub-modules embedded within the controller 34. As can be appreciated, the sub-modules shown in FIG. 6 can be combined and/or further partitioned to similarly detect road construction. Inputs to the system 100 may be received from the sensor system 28, received from other control modules (not shown) associated with the autonomous vehicle 10, received from the communication system 36, and/or determined/modeled by other sub-modules (not shown) within the controller 34 of FIG. 1.

FIGS. 4 and 5 present examples that are helpful in understanding the operation of the system shown in FIG. 6. Referring now to FIG. 4, a vehicle 10 is illustrated as traveling along a roadway 211 (i.e., to the right in the figure). Also illustrated are roadways 212 and 213 as well as three route segments (defined by a navigation system and stored, for example, in database 53) 221, 222, and 223, which correspond respectively to roadways 211, 212, and 213. In this example, it is assumed that route information associated with a destination (not illustrated) includes route segments 221 and 223—i.e., the planned path of vehicle 10 originally includes turning left at the upcoming intersection, rather than continuing straight toward road segment 222 (roadway 212).

However, as illustrated in FIG. 4, a road construction zone 200 is present along the intended route. In accordance with various embodiments, and as described in further detail below, road construction sensing system 100 (e.g., construction-related object recognition module 320) determines the presence of construction-related objects 270 (outputs 303 in FIG. 6) in the environment. Next, a determination is made (e.g., via construction zone determination module 330) as to whether construction zone 200 is of the type that might impact travel of vehicle 10 along its intended route (based, for example, on the number and types of construction related objects 270 within construction zone 200). The result of this determination is shown as output 304 in FIG. 6.

If it is determined that construction zone 200 is likely to impact travel of vehicle 10, information related to construction zone 200 is related to an external server (e.g., database 53), which then provides to vehicle 10 information regarding an alternate route. In the illustrated embodiment, for example, the alternate route might include replacing route segment 223 with route segment 222 in order to reach the desired destination (not illustrated), thereby avoiding the travel-impacting construction zone 200.

FIG. 5 depicts just a few examples of possible construction-related objects 270 that might be determined by module 320 based on sensor data 302, including: one or more traffic cones 274; one or more traffic barriers 273; one or more traffic barrels 272; signage typically associated with construction, such as a temporary construction sign 276 or a hand-held "slow" sign 277; a helmet 279 and/or reflective vest 278 as might be worn by a construction worker; road construction equipment 275; and/or one or more arrow board trailers 271. It will be understood that the objects, artifacts, text, graphical features, and iconography depicted in FIG. 5 are not intended to be limiting. Based on the context (e.g., the country in which vehicle 10 is operating) the nature of the construction-related objects 270 may vary.

Figure 7:
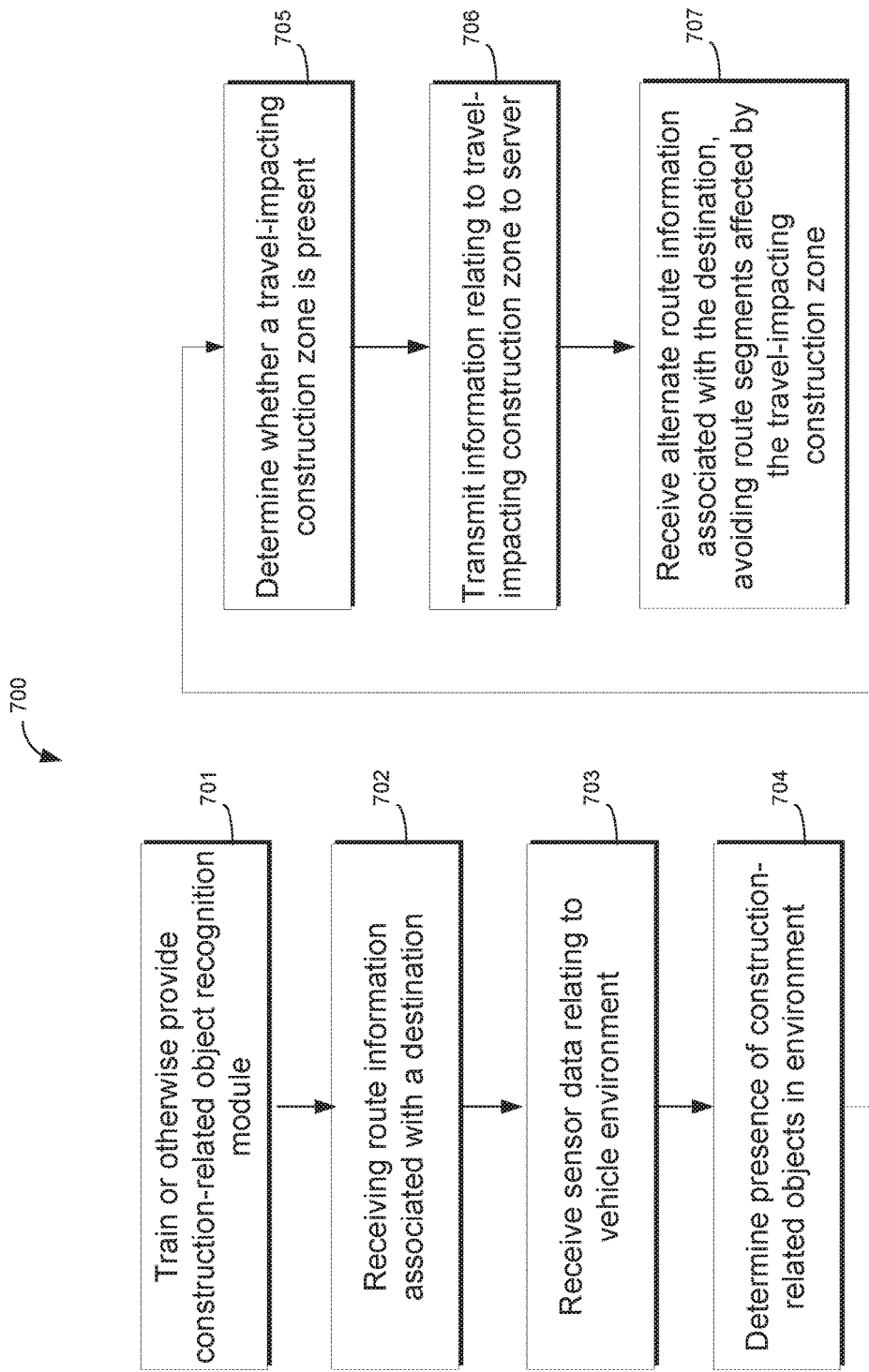
FIG. 7 is a flowchart illustrating a control method for controlling the autonomous vehicle, in accordance with various embodiments.

Referring now to FIG. 7, and with continued reference to FIGS. 1-6, a flowchart illustrates a control method 700 that can be performed by the system 100 of FIG. 6 in accordance with the present disclosure. As can be appreciated in light of the disclosure, the order of operation within the method is not limited to the sequential execution as illustrated in FIG. 7, but may be performed in one or more varying orders as applicable and in accordance with the present disclosure. In various embodiments, the method 700 can be scheduled to run based on one or more predetermined events, and/or can run continuously during operation of the autonomous vehicle 10.

In various embodiments, the method may begin at 701, in which construction-related object recognition module 320 is suitably trained. This training may be performed via a variety of supervised or unsupervised machine learning techniques. In various embodiments, module 320 implements an artificial neural network (ANN) that is trained via supervised learning by presenting it with a training set comprising a number of images of known construction-related objects. In one embodiment, module 320 implements a convolutional neural network (CNN) as described in further detail below in connection with FIG. 8.

With continued reference to FIG. 7, during normal operation the vehicle 10 receives route information associated with a destination (702). This may be performed automatically or in response to a request from a user. In general, the route information will include an ordered list of route segments (such as segments 221 and 223 in FIG. 4).

As detailed above, vehicle 10 will also receive (at 703) sensor data (302 in FIG. 6) relating to the vehicle's environment. In connection with the illustrated embodiment, the sensor data 302 will generally include optical image data (such as that received from a camera) but might also include lidar data and the like. That is, while optical image data might be particularly useful in detecting construction related objects 270, lidar sensors might also be used to determine the range of such objects relative to vehicle 10 (e.g., based on point-cloud imaging).

Next, at 704, module 320 (FIG. 6) determines the presence of construction-related objects 270 in the environment. In various embodiments, for example, the sensor data 302 is applied to a previously trained CNN (within module 320) that produces one or more outputs indicative of the presence of objects 270. For example, outputs 303 might include pairs of identifiers and corresponding real number values indicative of the probability that such an object has been recognized in the scene (e.g., traffic cone:0.87, construction equipment:0.2, etc.). It will be appreciated that output 303 might take a variety of forms depending upon the particular machine learning technique implemented by module 320.

Next, at 704, module 330 determines whether a travel-impacting construction zone (200) is present within the environment. This determination may take a variety of forms, but will generally be based on the number, position, and/or type(s) of construction-related objects detected. For example, if only a single traffic cone (274 in FIG. 5) is detected near the edge of a roadway (e.g., 211 in FIG. 4), module 330 might determine that, even if a construction-related zone exists in the environment, that zone is not "travel-impacting"—i.e., it does not block or significantly impede the progress of vehicle 10 (and other vehicles) along the desired route (route segments 221 and 223 in FIG. 4). In some embodiments, the recognition of a construction zone does not solely reside within the processing entities of the vehicle. If one or more construction objects are detected, the vehicle may contact a back office server for reinforcing data, such as vehicle location correlated to known or emerging construction zones along with real-time traffic reports that may imply construction zones that are not reflected in a known construction database.

In one embodiment, construction zone determination module 330 receives outputs 303 associated with construction-related artifacts and objects by the various sensors and localizes them in 3D space by combining distance estimations and ray projection using the extrinsic parameters of the calibrated sensors. The nature and position of the construction-related objects 270 relative to the roadway lanes are used to determine various configurations of temporary traffic occlusion, including, without limitation: None (e.g., the objects are not on the road, but are located on a sidewalk or are associated with building construction), Partial (a portion, but not all, of a lane is occluded, allowing the car to nudge around the obstacle by using available free-space, regardless of mapped lane boundaries), Lane blocked (e.g., a lane is fully blocked and cannot be used by the vehicle, and thus the vehicle will attempt to change lanes), and Road blocked (e.g., no other lanes are available on the road, leading to a black-listing of the segment of road for use in subsequent route guidance). In each case the autonomous vehicle might try to find a way through the construction-related objects. If the vehicle is unable to do so, it may contact an expert remotely to unlock the movement. One particular case of construction artifacts being treated differently concerns the interpretation of construction signs before entering a construction zone, such as a construction diamond sign warning of construction work ahead. In effect, the information that a construction zone will be encountered can be known several hundred feet before the construction-related objects actually appear in the visual field of the vehicle.

Next, at 706, information regarding the nature of construction zone 200 is transmitted to an external server (e.g., route database server 53 in FIG. 2) and then propagated to other modules within the vehicle to generate peripheral behaviors such as reducing speed, preventive calls to a remote expert, warning the passenger, and/or the like. The construction-zone information might include, for example, the geographical location of zone 200 (e.g., latitude, longitude, etc.), the severity of the zone (e.g., 'lane blocked', 'road blocked', 'partial', etc.), and the route segments that are affected (e.g., 'route segment 223'). This information may be stored within database server 53 using any suitable data structure known in the art. In one embodiment, for example, tags are associated with each of the route segments stored in server 53 indicating the state of the segment ('blocked,' 'slow,' 'blocked,' etc.) These tags can then be used by the server when planning routes for subsequent requests from vehicle 10 and/or other vehicles. That is, the route segments may be assigned a cost based on their states, such that the affected segments are either "black listed" from future routes or merely associated an appropriate cost or weight depending upon the severity of the construction zone. Such tags may then be modified based on whether a vehicle determines that the zone no longer exists. In various embodiments, a human user may assist in evaluating whether the construction zone currently exists based on a "proposal" made by the system to remove the zone 200 from the affected route segments.

Finally, at 707, vehicle 10 (and/or another vehicle) receives alternate route information associated with the destination, avoiding route segments affected by the travel-impacting construction zone 200. In FIG. 4, for example, this results in a new route that does not include route segment 223.

As mentioned above, construction-related object recognition module 320 may implement a variety of machine learning methodologies, such as an image-centric artificial neural network that undergoes supervised training using a set of training images including a variety of construction-related objects. In that regard, FIG. 8 is a block diagram of an exemplary convolutional neural network (CNN) in accordance with various embodiments.

Figure 8:
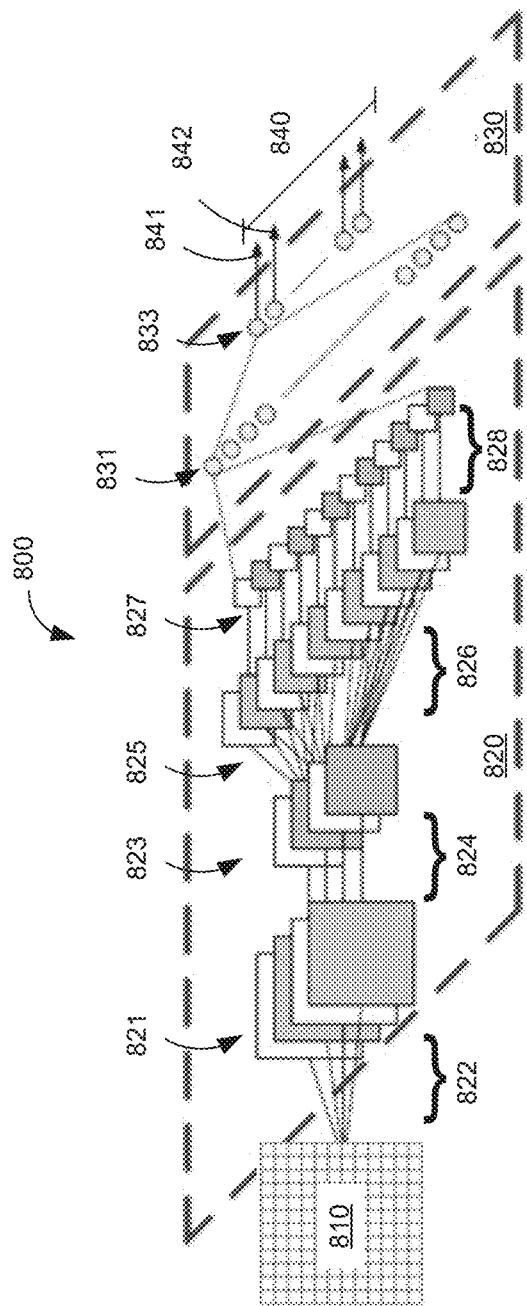
FIG. 8 is a block diagram of an exemplary convolutional neural network in accordance with various embodiments.

As shown in FIG. 8, an exemplary CNN 800 generally receives an input image 810 (e.g., an optical image of the environment from sensors 28) and produces a series of outputs 840 associated with whether and to what extent certain construction-related objects are recognized within the image. In that regard, input 810 will be referred to without loss of generality as an "image," even though it might include a variety of sensor data types.

In general, CNN 800 implements a convolutional phase 822, followed by feature extraction 820 and classification 830. Convolutional phase 822 uses an appropriately sized convolutional filter that produces a set of feature maps 821 corresponding to smaller tilings of input image 810. As is known, convolution as a process is translationally invariant—i.e., features of interest (traffic cones, etc.) can be identified regardless of their location within image 810.

Subsampling 824 is then performed to produce a set of smaller feature maps 823 that are effectively "smoothed" to reduce sensitivity of the convolutional filters to noise and other variations. Subsampling might involve taking an average or a maximum value over a sample of the inputs 821. Feature maps 823 then undergo another convolution 828, as is known in the art, to produce a large set of smaller feature maps 825. Feature maps 825 are then subsampled to produce feature maps 827.

During the classification phase (830), the feature maps 827 are processed to produce a first layer 831, followed by a fully-connected layer 833, from which outputs 840 are produced. For example, output 841 might correspond to the likelihood that a traffic cone (such as 274 in FIG. 5) has been recognized, output 842 might correspond to the likelihood that 'slow' sign 277 has been recognized, etc.

In general, the CNN illustrated in FIG. 8 trained (701 in FIG. 7) in a supervised mode by presenting it with a large number (i.e., a "corpus") of input images (801) and "clamping" outputs 840 based on which construction-related objects are present within the scene. Backpropagation as is known in the art is then used to refine the training CNN 800. The resulting module is then implemented within module 320 of FIG. 6. Subsequently, during normal operation, the trained CNN is used to process images 810 received as vehicle 10 moves through its environment and observes possible construction zones.

It will be appreciated that the present embodiments are not limited to the CNN model described above. A variety of machine learning techniques may be used, including, for example, recurrent neural networks (RNN), random forest classifiers, Bayes classifiers (e.g., naive Bayes), principal component analysis (PCA), support vector machines, linear discriminant analysis, and the like.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of detecting road construction comprising:
receiving, from a sensor system, sensor data including optical sensor data, relating to an environment associated with a vehicle;
determining, with a processor, that construction-related objects are present within the environment based on the sensor data by applying the optical sensor data to a pre-trained machine-learning model stored within the vehicle;
determining, with a processor, whether a construction zone is present within the environment and whether the construction zone is a travel-impacting construction zone based on the presence of the construction-related objects in the environment and a number, a position, and a type of the construction-related objects;
determining, with a processor, an impact on a route from the construction zone;
classifying, with a processor, the impact on a route from the construction zone as:
a partial lane blockage when the construction zone causes a partial lane blockage, a lane blockage when the construction zone causes a lane closure, and a road blockage when the construction zone causes a blocked road; and
transmitting a geographical location of the construction zone and the classified impact from the construction zone over a network to an external server.

2. The method of claim 1, further including receiving, at the vehicle, route information associated with a destination, the route information configured to avoid the travel-impacting construction zone.

3. The method of claim 1, further including transmitting information related to the travel-impacting construction zone over a network to a server.

4. The method of claim 1, wherein determining that the construction-related objects are present within the environment includes providing the sensor data to an artificial neural network model.

5. The method of claim 4, wherein the sensor data is provided to a convolutional neural network model.

6. The method of claim 1, wherein determining that construction-related objects are present within the environment includes determining the presence of at least one of: a traffic cone, a traffic barrier, a traffic barrel, a construction sign, a reflective vest, a construction helmet, an arrow-board trailer, and a piece of construction equipment.

7. The method of claim 1, wherein the sensor data includes optical sensor data.

8. The method of claim 7, wherein the sensor data includes lidar sensor data.

9. A system for controlling a vehicle, comprising:
a construction-related object module, including a processor and machine-readable software instructions stored on non-transitory media that, when executed by the processor, are configured to receive sensor data including optical sensor data relating to an environment associated with the vehicle and determine that construction-related objects are present within the environment based on the sensor data by applying the optical sensor data to a pre-trained machine-learning model stored within the vehicle; and
a construction zone determination module, including a processor and machine-readable software instructions stored on non-transitory media that, when executed by the processor, are configured to:
determine whether a construction zone is present within the environment and whether the construction zone is a travel-impacting construction zone based on the presence of the construction-related objects in the environment and a number, a position, and a type of the construction-related objects;
determine an impact on a route from the construction zone;
classify the impact on a route from the construction zone as: a partial lane blockage when the construction zone causes a partial lane blockage, a lane blockage when the construction zone causes a lane closure, and a road blockage when the construction zone causes a blocked road; and
transmit a geographical location of the construction zone and the classified impact from the construction zone over a network to an external server.

10. The system of claim 9, further including a communication system configured to transmit information related to the travel-impacting construction zone over a network to a server.

11. The system of claim 10, wherein the construction-related object module includes an artificial neural network model.

12. The system of claim 11, wherein the artificial neural network model is a convolutional neural network.

13. The system of claim 9, wherein the construction-related objects includes at least one of: a traffic cone, a traffic barrier, a traffic barrel, a construction sign, a reflective vest, a construction helmet, an arrow-board trailer, and a piece of construction equipment.

14. The system of claim 9, wherein the sensor data comprises optical sensor data.

15. An autonomous vehicle, comprising:
at least one sensor that provides sensor data, including optical sensor data; and
a controller that, by a processor and based on the sensor data:
receives sensor data relating to an environment associated with a vehicle;
determines that construction-related objects are present within the environment based on the sensor data by applying the optical sensor data to a pre-trained machine-learning model stored within the vehicle;
determines whether a construction zone is present within the environment and whether the construction zone is a travel-impacting construction zone based on the presence of the construction-related objects in the environment and a number, a position, and a type of the construction-related objects;
determines an impact on a route from the construction zone;
classifies the impact on a route from the construction zone as: a partial lane blockage when the construction zone causes a partial lane blockage, a lane blockage when the construction zone causes a lane closure, and a road blockage when the construction zone causes a blocked road; and
transmits a geographical location of the construction zone and the classified impact from the construction zone over a network to an external server.

16. The autonomous vehicle of claim 15, further including a communication system configured to transmit information related to the travel-impacting construction zone over a network to a server.

17. The autonomous vehicle of claim 16, further including a navigation system configured to receive, from the server, route information associated with a destination, the route information configured to avoid the travel-impacting construction zone.

18. The autonomous vehicle of claim 15, wherein the controller implements a convolutional neural network model.

19. The autonomous vehicle of claim 15, wherein the at least one sensor includes at least one of an optical sensor and a lidar sensor.

20. The autonomous vehicle of claim 15, wherein the construction-related objects includes at least one of: a traffic cone, a traffic barrier, a traffic barrel, a construction sign, a reflective vest, a construction helmet, an arrow-board trailer, and a piece of construction equipment.

* * * * *